United States Patent
Kiest, Jr.

(10) Patent No.: US 7,987,873 B2
(45) Date of Patent: Aug. 2, 2011

(54) DEVICE AND METHOD FOR REPAIRING PIPE

(75) Inventor: Larry W. Kiest, Jr., Ottawa, IL (US)

(73) Assignee: LMK Enterprises, Inc., Ottawa, IL (US)

( * ) Notice: Subject to any disclaimer, the term of this patent is extended or adjusted under 35 U.S.C. 154(b) by 756 days.

(21) Appl. No.: 12/026,909

(22) Filed: Feb. 6, 2008

(65) Prior Publication Data

US 2009/0194184 A1     Aug. 6, 2009

(51) Int. Cl.
*F16L 55/16* (2006.01)
*E21D 11/00* (2006.01)

(52) U.S. Cl. ......... 138/98; 138/97; 264/269; 405/150.1; 156/287

(58) Field of Classification Search ............... 138/97, 138/98; 405/154, 156, 157, 184, 150.1; 264/269; 156/287
See application file for complete search history.

(56) References Cited

U.S. PATENT DOCUMENTS

| | | | |
|---|---|---|---|
| 5,108,533 A | 4/1992 | Long, Jr. et al. | |
| 5,393,481 A | 2/1995 | Wood | |
| 5,501,248 A | 3/1996 | Kiest, Jr. | 138/98 |
| 5,560,395 A | 10/1996 | Bissonnette | 138/98 |
| 5,609,439 A | 3/1997 | Schreiner | 405/184.2 |
| 5,624,629 A | 4/1997 | Wood | |
| 5,692,543 A | 12/1997 | Wood | |
| 5,706,861 A | 1/1998 | Wood et al. | |
| 5,762,450 A | 6/1998 | Schmager | 405/184.2 |
| 5,765,597 A | 6/1998 | Kiest | |
| 5,794,663 A | 8/1998 | Kiest et al. | |
| 5,816,293 A | 10/1998 | Kiest | |
| 5,855,729 A | 1/1999 | Kiest | |
| 5,915,419 A | 6/1999 | Tweedie et al. | |
| 5,927,341 A | 7/1999 | Taylor | |
| 5,950,682 A | 9/1999 | Kiest, Jr. | |
| 5,964,249 A | 10/1999 | Kiest | |
| 5,975,878 A | 11/1999 | Wood et al. | |
| 6,001,212 A | 12/1999 | Polivka et al. | |
| 6,021,815 A | 2/2000 | Kiest et al. | |
| 6,029,726 A | 2/2000 | Tweedie et al. | |
| 6,039,079 A | 3/2000 | Kiest, Jr. | |
| 6,044,867 A | 4/2000 | Tweedie et al. | |
| 6,068,725 A | 5/2000 | Tweedie et al. | |
| 6,085,794 A | 7/2000 | Kamiyama et al. | 138/98 |
| 6,105,619 A | 8/2000 | Kiest, Jr. | |

(Continued)

FOREIGN PATENT DOCUMENTS

DE     199 00 441 A1     7/2000

(Continued)

OTHER PUBLICATIONS

Interntional Search Report, PCT/US2009/033172, LMK Enterprises, Inc., Jul. 24, 2009, 2 pages.

*Primary Examiner* — Patrick F Brinson
(74) *Attorney, Agent, or Firm* — McKee, Voorhees & Sease, P.L.C.

(57) ABSTRACT

The present invention relates to a new liner for repairing a damaged portion of a pipe. A lining tube formed from a non-resin absorbent material has an exterior surface adapted to receive a curable resin and contact an interior wall of the pipe. The present invention also includes a main/lateral liner assembly for repairing the junction between main and lateral pipes using a non-resin absorbent liner for at least a portion of the lining.

32 Claims, 10 Drawing Sheets

U.S. PATENT DOCUMENTS

| | | | |
|---|---|---|---|
| 6,146,491 A | 11/2000 | Wood et al. | |
| 6,167,913 B1 | 1/2001 | Wood et al. | |
| 6,199,591 B1 | 3/2001 | Kiest et al. | |
| 6,206,993 B1 | 3/2001 | Kiest et al. | |
| 6,337,114 B1 | 1/2002 | Wood et al. | |
| 6,427,726 B1 | 8/2002 | Kiest | |
| 6,478,054 B1 | 11/2002 | Kiest | |
| 6,482,280 B1 | 11/2002 | Kiest, Jr. et al. | |
| 6,484,757 B1 | 11/2002 | Warren | |
| 6,520,719 B1 | 2/2003 | Tweedie et al. | |
| 6,641,687 B2 | 11/2003 | Kiest, Jr. et al. | |
| 6,695,013 B2 | 2/2004 | Warren | |
| 6,705,801 B1 | 3/2004 | Kiest | |
| 6,827,526 B2 | 12/2004 | Warren | |
| 6,837,486 B1 | 1/2005 | Kiest, Jr. et al. | |
| 6,899,832 B2 | 5/2005 | Wood | |
| 6,994,118 B2 | 2/2006 | Kiest, Jr. et al. | |
| 7,306,011 B2 | 12/2007 | Kiest, Jr. | |
| 7,311,121 B2 | 12/2007 | Kamiyama et al. | 138/98 |
| 2005/0121092 A1 | 6/2005 | Kiest, Jr. | 138/98 |
| 2008/0029177 A1 | 2/2008 | Kamiyama et al. | 138/98 |

FOREIGN PATENT DOCUMENTS

| | | |
|---|---|---|
| EP | 0 413 494 A1 | 2/1991 |
| EP | 0 450 975 A2 | 10/1991 |
| WO | WO 97/41381 | 11/1997 |
| WO | WO 98/55795 | 12/1998 |
| WO | WO 00/26573 | 5/2000 |
| WO | WO 2006/128256 A1 | 12/2006 |

DEVICE AND METHOD FOR REPAIRING PIPE

BACKGROUND OF THE INVENTION

The present invention relates to a device and method for repairing pipe, such as underground sewer pipe and the like.

Prior methods for repairing damaged pipelines include moving a liner tube impregnated with a liquid material capable of curing and hardening to a position within the pipe where the damaged portion is located. The liner tube is urged in an outward radial direction into contact with the pipe being repaired and the liquid material impregnating the liner tube is permitted to cure and harden. The liner tube is installed by pulling, pushing or everting the liner into the host pipe. Once the liner tube is positioned within the host pipe, it is pressurized, causing the liner to press against the interior wall of the host pipe, and the liner is cured by applying heat, such as steam or hot water. These liners can also be cured at ambient temperatures by a chemical mixture which generates an exothermic reaction or by ultraviolet light. The liner tube forms an interior liner in the pipe for the pipeline being repaired. Such a process is known as cured-in-place pipelining.

On some occasions lateral pipes are connected to main pipes. Often damage occurs at the junction between the lateral pipe and the main pipe. T-shaped or Y-shaped liner tubes have been utilized to fit within the junction between the lateral and main pipes. Liner tubes form a T-shaped or Y-shaped liner after hardening to the interior of the junction between the pipes.

Figure 1:
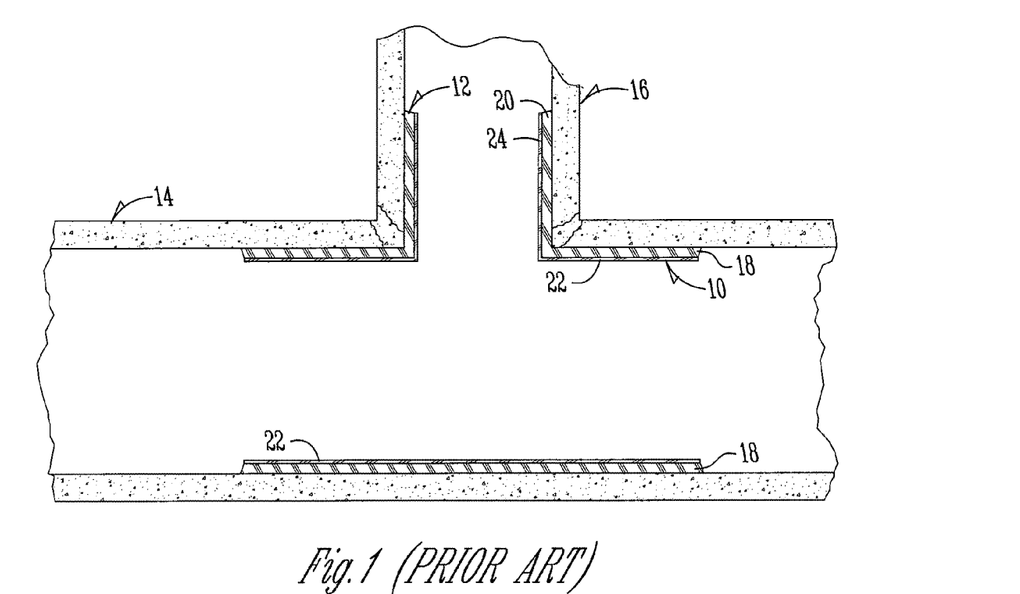
FIG. 1 is a sectional view of a main sewer pipe and a lateral sewer pipe, showing a T-shaped cured-in-place liner as used in the prior art.

An example of a T-shaped main/lateral liner installed in a pipeline is shown in FIG. 1. A main liner tube 10 and a lateral liner tube 12 form a one-piece lining along the interior walls of the main sewer pipe 14 and the lateral sewer pipe 16. Each of the liner tubes includes a felt lining portion 18, 20 and a plastic coating 22, 24.

A common material used for cured-in-place pipelining is a tube made of needle-punched felt with a coating on one surface. The coating is made of an impervious thermoplastic film, such as polyethylene (PE), polyvinyl chloride (PVC) or thermoplastic polyurethane (TPU). These plastic films must be flexible in order to negotiate bends in the pipeline and allow the lining tube to be everted into the pipeline under a fluid pressure. Most coatings have a thickness of approximately 15 mils.

The coating on the liner is used to help ensure a leak-free tube. Even though the liner tube is impregnated with resin and is cured as a one-piece continuous lining, there are small canals found in cured-in-place pipe that allow leakage. A coating impervious to water is therefore essential for creating a non-leaking cured-in-place pipe. However, these coatings are made of a thin plastic film, which over time wear away due to abrasion from water flow, silt and cleaning tools. Some of the coating materials are even water soluble, such as an ester grade TPU. The pipelining industry generally requires that the liners provide a minimum service life of 50 years. Service life is reduced when the film coatings are worn away as leakage occurs.

If the liner is to be everted into the host pipe, the coating on the liner is initially on the outside of the tube. Resin is introduced into the tube, which allows the felt liner to be impregnated with a liquid curable resin. The coating contains the resin within the tube. Once the liner is everted, the coating becomes the interior surface of the liner tube and the resin impregnable liner is on the outside and can be pressed against the interior of the host pipe.

A main/lateral lining includes lining the lateral pipe and a short section of the main pipe. An important part of the main/lateral liner is the main liner portion and its connection to the lateral lining tube. One method of installing a main/lateral liner is to move the liner assembly through the main pipe until the assembly is aligned with the opening to the lateral pipe. A one-piece main/lateral bladder is used to inflate the main liner and evert the lateral liner, as shown in U.S. Pat. No. 6,039,079. The main liner of the main/lateral liner assembly is inflated by the action of a main bladder, pressing the main lining against the interior of the main pipe. The main liner may be stitched along its longitudinal edges to form a tube or may be formed by overlapping a sheet of material. The lateral lining tube is everted into the lateral pipe by action of the bladder assembly.

Because lateral pipes are smaller in diameter than the main pipe and lateral pipes often have bends, the eversion process for inserting the lateral lining tube into the lateral pipe requires a much higher fluid pressure than what is required to simply inflate the main liner. However, when using a one-piece main/lateral bladder assembly, the high pressure required to evert the lateral liner is also the same pressure being applied to the main liner.

Figure 2:
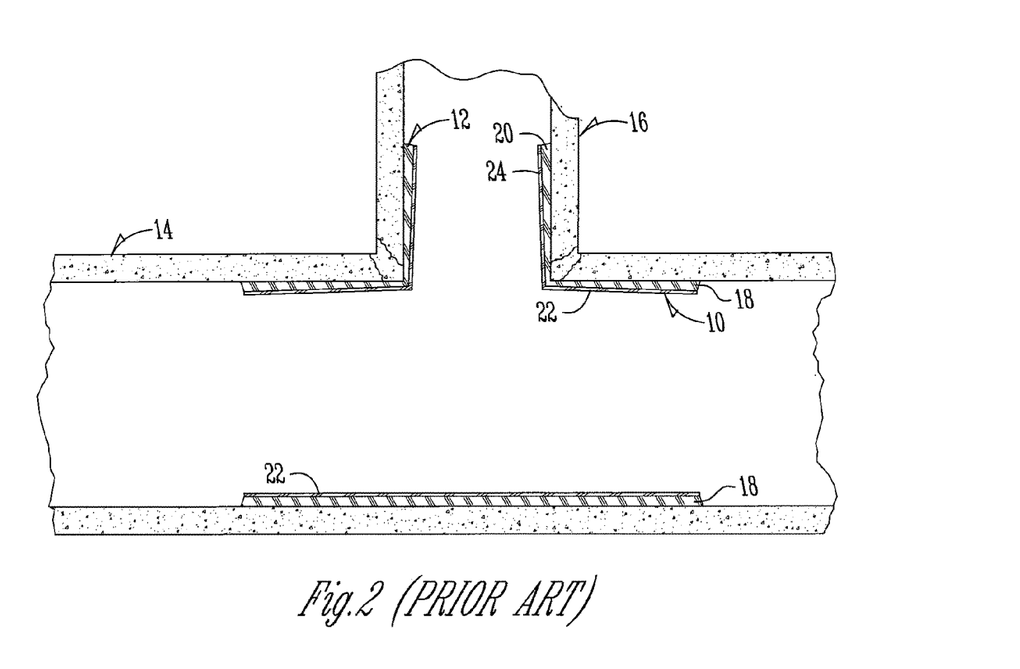
FIG. 2 is a sectional view similar to FIG. 1, showing a liner having a reduced wall thickness, as is common in the prior art.

When a resin impregnated tube is pressurized and pressed against the interior of the host pipe, resin migrates into open joints and fractures in the pipe. Resin migration is a positive attribute of the cured-in-place pipelining process. Lateral lining tubes are made from a flexible felt-like material that is soft and elastic so as to evert into small diameter pipe, such as 4-6 inch diameter pipe. However, when higher pressures are required to evert the lateral lining tube into the lateral pipeline, this pressure squeezes the flexible tube, causing the main/lateral liner assembly near the juncture between the main and lateral liners to become thin with insufficient wall thickness for the desired design calculations. This thinning of the resin absorbent lining is illustrated in FIG. 2. Maintaining sufficient wall thickness and resin volume of the liner is essential to meeting the minimum physical properties of the cured-in-place lining.

There is therefore a need in the art for a device and method of renewing a pipeline that achieves good resin migration, yet controls the thickness of the liner tube wall regardless of the process used to install the liner. There is also a need in the art for a new liner that resists compression, maintains sufficient wall thickness, is durable, and effectively seals any cracks in the damaged section of pipe. There is also a need in the art for a new liner having a substantially impervious layer, providing a long service life leak-free lining.

BRIEF SUMMARY OF THE INVENTION

It is therefore a principal object, aspect, feature or advantage of the present invention to provide an apparatus and method for repairing a pipeline which improves over or solves the problems and deficiencies in the art.

Other objects, features, aspects and/or advantages of the invention relate to an apparatus and method which provides for good resin migration without sacrificing the wall thickness of the lining when high pressures are used to install the lining.

Further objects, features, aspects and/or advantages of the invention relate to a new liner that is durable and maintains sufficient wall thickness while still effectively repairing the damaged section of pipe.

Further objects, features, aspects and/or advantages of the invention relate to a new liner having a substantially impervious layer, providing a long service life leak-free lining.

These and other objects, features, aspects and advantages of the present invention will become more apparent with reference to the accompanying specification and claims.

The present invention may be used in all types of pipelining, such as lining an entire main sewer pipe from manhole to manhole, lining a section of sewer pipe, lining the entire length of a lateral pipe, lining a potable water main, lining a gas pipeline, lining a lateral pipe and the connection to a main pipe and other pipelines, conduits, ducts, casings, vaults, manholes, and similar structures. However, the advantages of the invention will be most appreciated by those skilled in the art when the invention is used for lining a lateral pipe and its connection to a main pipe.

One aspect of the invention includes a lining tube formed from a non-resin absorbent material having an exterior surface adapted to receive a curable resin that contacts the interior wall of the pipeline. The non-resin absorbent material resists compression and does not thin an appreciable amount when subjected to high fluid pressures. The exterior surface of the lining tube is preferably uneven and may include a plurality of projections that anchor the resin to the liner tube once the resin cures and hardens about the exterior surface of the liner tube.

Another aspect of the invention includes a lining tube formed from a non-resin absorbent material having a plurality of apertures. The apertures are adapted to receive a curable resin that secures the lining tube to the interior wall of the host pipe.

Another aspect of the invention includes a liner assembly for repairing a damaged pipe junction between a main pipe and a lateral pipe. A lateral lining tube extends from a main liner member formed from a non-resin absorbent material. The uneven exterior surface of the main liner member, which is adapted to contact the interior wall of the main pipeline, creates voids for receiving a curable resin. The voids can be created by a variety of different shapes on the exterior surface of the main liner member that preferably help to mechanically lock or anchor the resin to the main liner member once the resin cures and hardens. The main liner member can take the shape of a flat sheet wrapped to form a tubular structure. Other shapes and configurations are also contemplated.

Another aspect of the invention includes a method of repairing a damaged pipe junction between the main pipe and a lateral pipe. A main/lateral lining assembly formed from a lateral lining tube of resin absorbent flexible material and a main liner member made of a non-resin absorbent material is provided. A resinous material capable of curing and hardening is applied to the exterior surface of the main liner member, and the lateral liner tube is impregnated with a resinous material capable of curing and hardening. The liner assembly is moved through the main pipe to an operative position wherein the main liner member is adjacent the junction between the main pipe and the lateral pipe. The lateral lining tube is inserted into the lateral pipe and the lateral lining tube and the main liner member are pressed against the interior walls of the lateral pipe and main pipe, respectively. In a preferred form, the main liner member forms a tubular structure and compressible bands are placed around the main liner member in a spaced apart relationship and on opposite sides of the opening to the lateral pipe. The compressible bands are preferably hydrophilic and thus capable of swelling in response to being exposed to a liquid, thereby forming a seal between the main liner member and the interior wall of the main pipe. A compressible member may cover a portion or all of the main liner member, and various other sealing members can also be used.

Those skilled in the art having the benefit of this disclosure will recognize additional variations and aspects of the invention using the non-resin absorbent lining. For example, use of the non-resin absorbent lining is not limited to the main liner member in a main/lateral lining assembly. The non-resin absorbent material can also be used to form all or part of the lateral lining tube.

DETAILED DESCRIPTION OF THE EXEMPLARY EMBODIMENTS

For a better understanding of the invention, several examples of forms of the invention will now be described in detail. Frequent reference will be made to the accompanying figures. Reference numerals will be used to indicate certain parts or locations in the figures. The same reference numerals will be used to indicate the same or similar parts or locations throughout the figures unless otherwise indicated.

Figure 3:
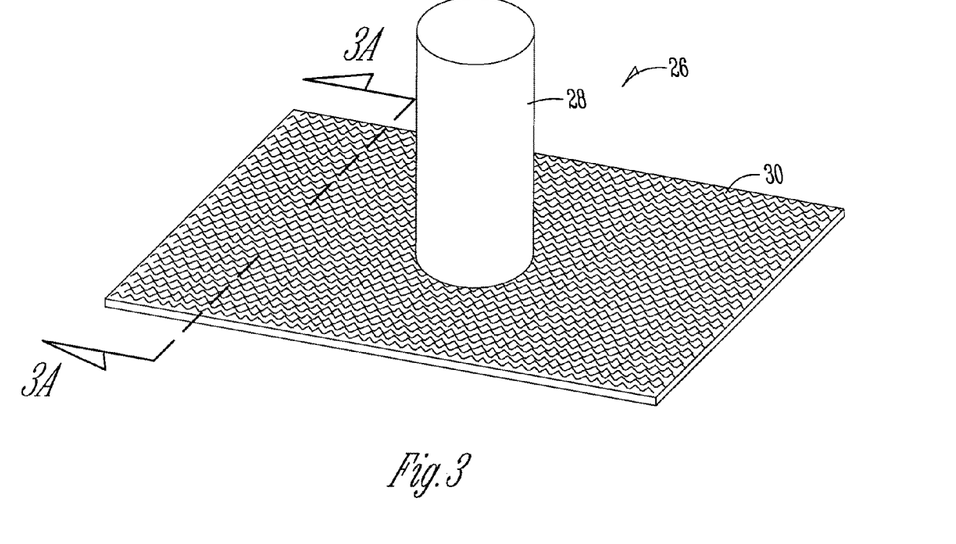
FIG. 3 is a perspective view of a main/lateral liner assembly of a preferred embodiment of the present invention.

Referring to FIG. 3, a main/lateral liner assembly is generally designated by the numeral 26. The liner assembly 26 includes a lateral liner tube 28 and a main liner member or portion 30.

The lateral liner tube 28 is made from a needle punched felt lining material with a plastic film lining on the outside. The coating is made from an impervious thermoplastic film, such as PE, PVC, or PU, as previous discussed. If the lateral liner tube 28 is to be everted into a lateral pipeline, then the plastic film coating is initially on the outside of the tube so that when the tube is everted the felt lining material is pressed against the interior of the host pipe and the plastic film coating is on the inside.

The main liner member 30 is made from a non-resin absorbent material, which resists compression so that the wall thickness does not thin an appreciable amount under high pressure. The mainliner member is preferably made from a sheet of thermoplastic material impervious to water and other liquids. The preferred material is thermal polyurethane (TPU) or polyvinyl chloride (PVC). Other non-resin absorbent materials may be used, such as thermoset plastics, as well as other types of flexible semi-rigid or rigid plastics and fiberglass.

In the preferred embodiment, the main liner member 30 is wrapped to form a tubular structure that seats against the main sewer pipe 14 around the aperture to the lateral sewer pipe 12. A tube may be formed by welding opposite edges of the main liner member 30 using heat or a solvent to bond the edges together. A tube may also be formed by stitching or other means of connecting the edges of the main liner member 30 together. A main liner may also be formed by simply wrapping a flat sheet to form a tube with the opposite edges overlapping. It is preferred that the main liner member 30 be formed by wrapping a flat sheet of the plastic material around a launching device 32 with the flat sheet held in place with hydrophilic bands or O-rings 34 (see FIG. 4).

Figure 3A:
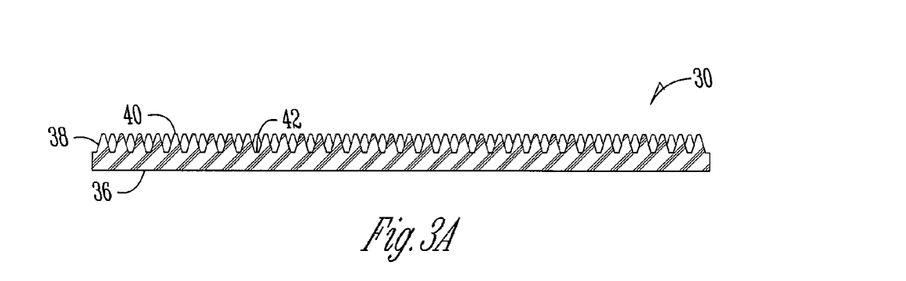
FIG. 3A is a sectional view of a main liner member of the main/lateral liner assembly in FIG. 3 taken along line 3A-3A of FIG. 3.

FIG. 3A shows a cross-section of the main liner member 30 as a flat sheet. The main liner member 30 when wrapped includes an interior surface 36 and an exterior surface 38. Because the main liner member 30 is non-resin absorbent, the exterior surface 38 is uneven, which forms a plurality of voids or spaces 42 for receiving a curable resin. As such, the uneven exterior surface 38 can receive a liquid curable resin which contacts the interior wall of the host pipe to secure the main liner member 30 to the host pipe.

The exemplary embodiment shown in FIGS. 3 and 3A includes a plurality of protrusions 40 with spaces 42 formed there between. A variety of uneven surfaces are contemplated, and the protrusions can have more or less curvature than what is shown. It is preferred, however, that the uneven surface also be irregular to avoid forming elongated troughs, slots or channels that would allow the resin to easily escape or run off the exterior surface 38. Instead, it is preferred that the voids or spaces are formed such that the resin has a more obstructed path of travel when the exterior surface of the main liner member 30 is pressed against the host pipe. The exterior surface 38 can be formed in an extrusion, injection molding process, a thermoset mold or by milling.

Figure 3B:
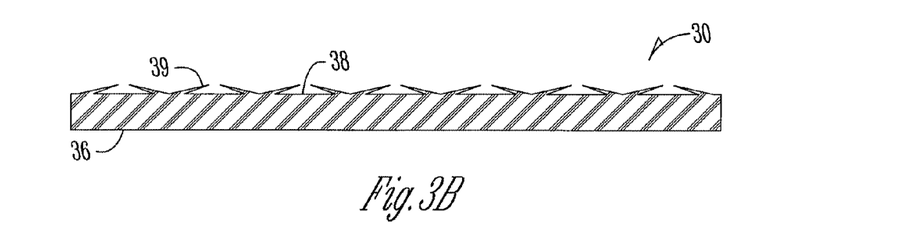
FIG. 3B is a sectional view of an alternative main liner member.
Figure 3C:
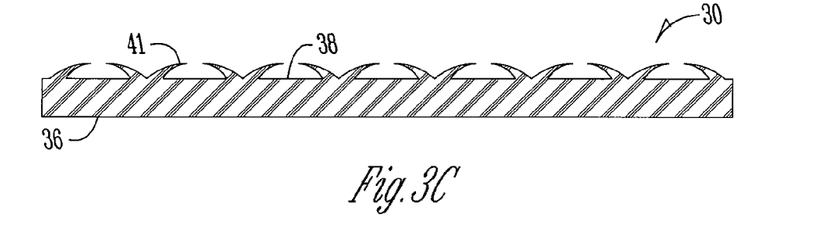
FIG. 3C is a sectional view of an alternative main liner member.
Figure 3D:
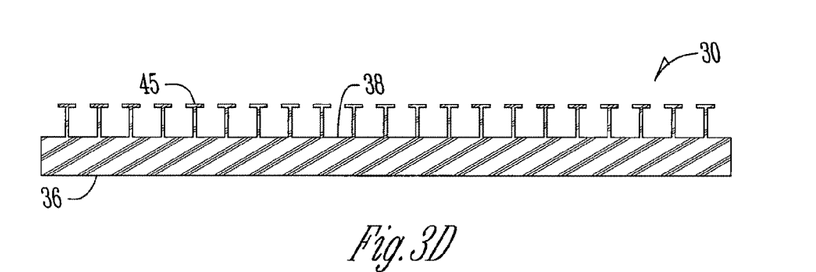
FIG. 3D is a sectional view of an alternative main liner member.

The uneven exterior surface 38 of the main liner member 30 can also include various projections that form anchors that trap the resin on the exterior surface 38 once the resin cures and hardens to mechanically lock the cured resin to the main liner member 30. Examples are shown in FIGS. 3B, 3C and 3D wherein the projections 39, 41, 45 are intended to trap the cured resin and mechanically lock the resin to the main liner member 30. As such, the adhesive property of the resin in combination with the mechanical locking created by the projections 39, 41, 45 fixes the resin to the main liner member 30. Various shapes for the projections 39, 41, 45 are contemplated, some of which are hooklike, and would include various shaped ledges, spines, spikes, prongs, arrowheads, tines and other protrusions that trap the resin once cured. The projections 39, 41, 45 are preferably uniformly spared about the exterior surface 38 of the main liner member 30.

The resin, which is applied to the liner before insertion into the host pipe, may be an epoxy, a urethane, vinyl ester, polyester, silicate, or other applicable resin. The resin has been found to perform best when it is in a mastic state so that the resin will remain in the voids or spaces and not run off of the main liner member 30. An example of a resin found suitable for use with the present invention is "Manus Bond Flex Weld 15", which is manufactured and distributed by Manus Products, Inc. of 866 Industrial Boulevard West, Waconia, Minn. 55387.

Figure 4:
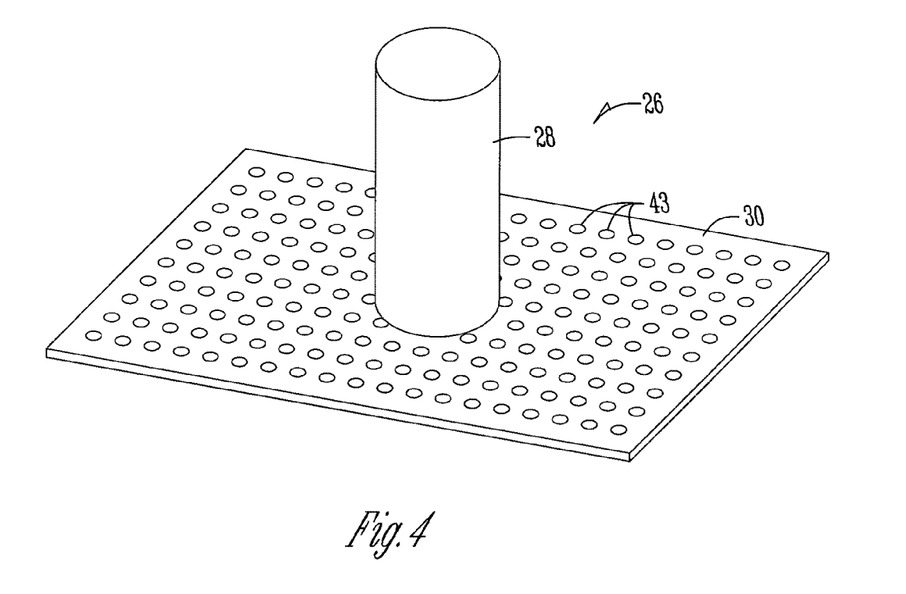
FIG. 4 is a perspective view of an alternative embodiment of a main/lateral liner assembly.

As an alternative to the exterior surface 38 of the main liner member 30 being uneven on its face to create spaces for accepting a resin, the main liner member 30 can include a plurality of apertures 43, as shown in FIG. 4. The apertures 43 are capable of receiving a curable resin to secure the main liner member 30 to the host pipe. The apertures 43 may be punched in the main liner member 30 or formed in an injection molding process. Those skilled in the art will appreciate that the size, shape and number of apertures can vary depending upon size and thickness of the main liner member. Because the bladder used to press the main liner member will likely contact the resin in the apertures of the main line member 30, it is preferable to use a bladder material that does not tend to adhere to the resin. One such bladder is formed from a thermoplastic material, as disclosed in pending application Ser. No. 12/026,209, the contents of which are incorporated herein by reference.

The main liner member 30 may also take the form of a flat sheet without an uneven surface or apertures to receive a curable resin. Here, epoxy putty is substituted for the resin to seal the damaged portion of the host pipe and adhere the main liner member 30 to the host pipe. An epoxy putty, such as Epoxical 600 molding putty manufactured by Manus Products, Inc. of 866 Industrial Boulevard West, Waconia, Minn. 55387, is suitable for use with this embodiment.

It is preferred that the main liner member 30 have a wall thickness significantly greater than the thin plastic coatings used with felt liners in the prior art. The main liner member 30 is preferably greater than 50 mils thick; a wall thickness of 80-100 mils, which is approximately five to six times greater in thickness than the prior art film coatings, is most preferable. This increased thickness provides a surface that is much more resistant to abrasion, cleaning tools and degrading, all of which greatly extend the service life of the main liner member 30, a critical portion of the main/lateral liner assembly 26.

Figure 5:
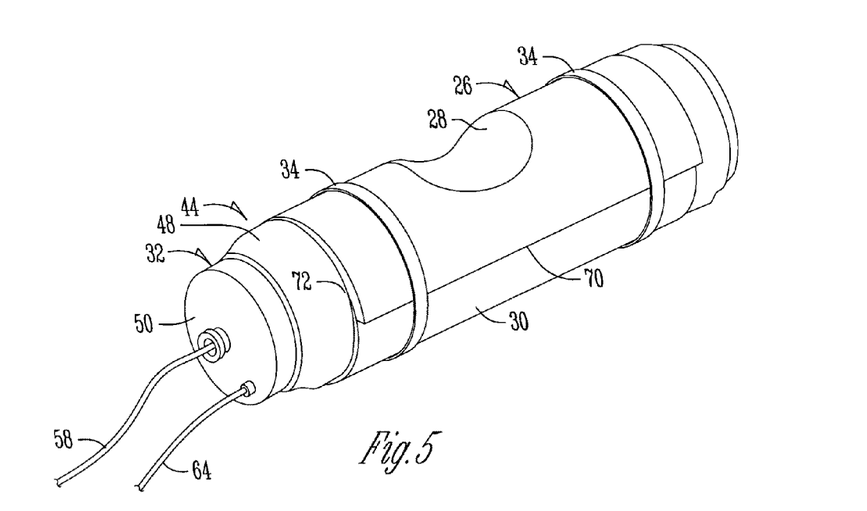
FIG. 5 is a perspective view of a repair assembly for repairing a lateral sewer pipe and the junction between the lateral sewer pipe and a main sewer pipe.

Referring to FIG. 5, a repair assembly 44 is shown. Repair assembly 44 includes a launcher device 32 having mounted thereto a T-shaped or Y-shaped main/lateral liner assembly 26. The repair assembly 44 also houses a T-shaped or Y-shaped bladder assembly 46. In the particular configuration shown in FIGS. 5-7, the main/lateral liner assembly 26 and bladder assembly 46 are T-shaped, but they could be Y-shaped to accommodate a lateral pipe that intersects with a main pipe at an oblique angle.

Launcher device 32 includes side walls 48, an end cap 50 and an end wall 52, all of which form a launcher device cavity 54. End cap 50 includes a line inlet 56 through which a line 58 extends. Line 58 is attached to a closed bladder tube end 60. Also extending through the end cap 50 is an air inlet 62 which is connected to an air hose 64. T-shaped or Y-shaped bladder tube assembly 46 includes a main bladder tube 66 and a lateral bladder tube 68. Similarly, the T-shaped or Y-shaped main/lateral liner assembly 26 comprises the main liner member 30 (preferably a tubular structure) and a lateral liner tube 28. The main bladder tube 66 is positioned on the interior of the main liner member 30.

As can be seen in FIG. 5, the main liner member 30 preferably forms a tube from what is initially a flat sheet of thermoplastic material wrapped around the outside of the main bladder tube 66 and the launcher device 32. The main liner member 30 includes overlapping edges 70, 72.

It is preferred that a compressible member, such as hydrophilic bands or O-rings 34, be placed around the main liner member 30. FIG. 5 shows two bands 34, one on each side of the juncture between the main liner member 30 and the lateral liner tube 28. The hydrophilic bands 34 help keep the main liner member 30 wrapped around the main bladder tube 66 and the launcher device 32. In addition, the bands 34 swell when exposed to water and provide a seal between the main liner member 30 and the main sewer pipe 16. A manufacturer of such hydrophilic material is DeNeef Construction Chemical Co., 18314 Mathes Road, Waller, Tex. 77484, under the trademark SWELLSEAL™. A hydrophilic paste can also be used to form the ring or band 34 on the main liner member 30. One such hydrophilic paste is distributed by OCM, Inc. in Vernon Hills, Ill. under the trademark ADEKA ULTRA SEAL™, part number P-201. While it is preferred that the O-rings 34 be made of a hydrophilic material capable of swelling in response to being exposed to water or other liquid, other compressible materials found suitable include neoprene rubber, other similar gasket materials such as urethane or silicone rubber, and like impermeable compressible materials.

The launcher device 32 includes a launcher device opening 74, and the lateral bladder tube 68 is contained within the launcher device cavity 54 and surrounds the lateral liner tube 28. The construction of the main liner member 30 has been previously described. The lateral liner tube 28 is comprised of a felt layer, which is the lining surface that contacts the interior wall of the host pipe, and a polymer coating on the opposite surface.

Figure 6:
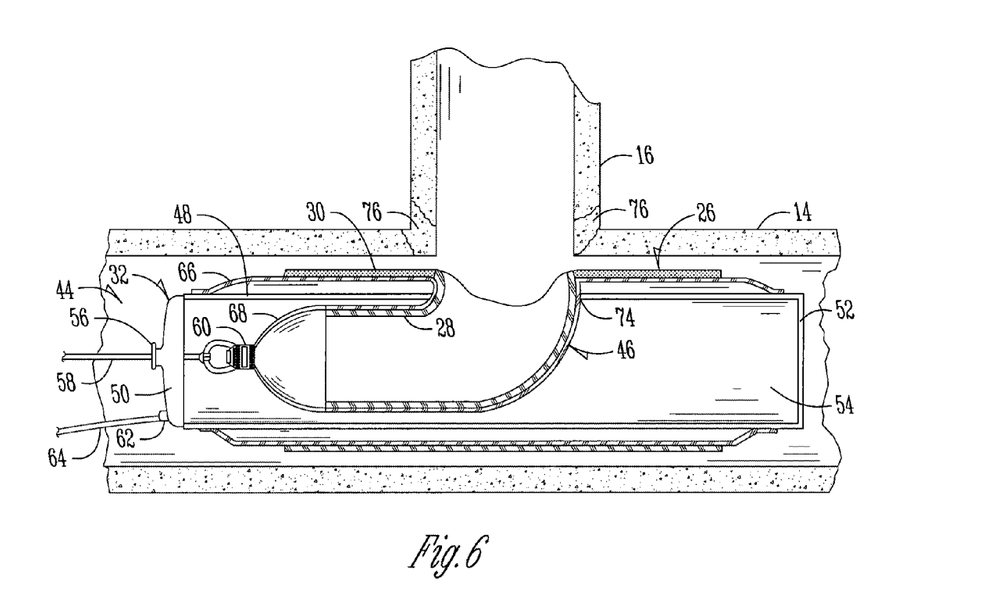
FIG. 6 is a sectional view of a main sewer pipe and a lateral sewer pipe, showing one embodiment of a main/lateral liner assembly of the present invention.
Figure 7:
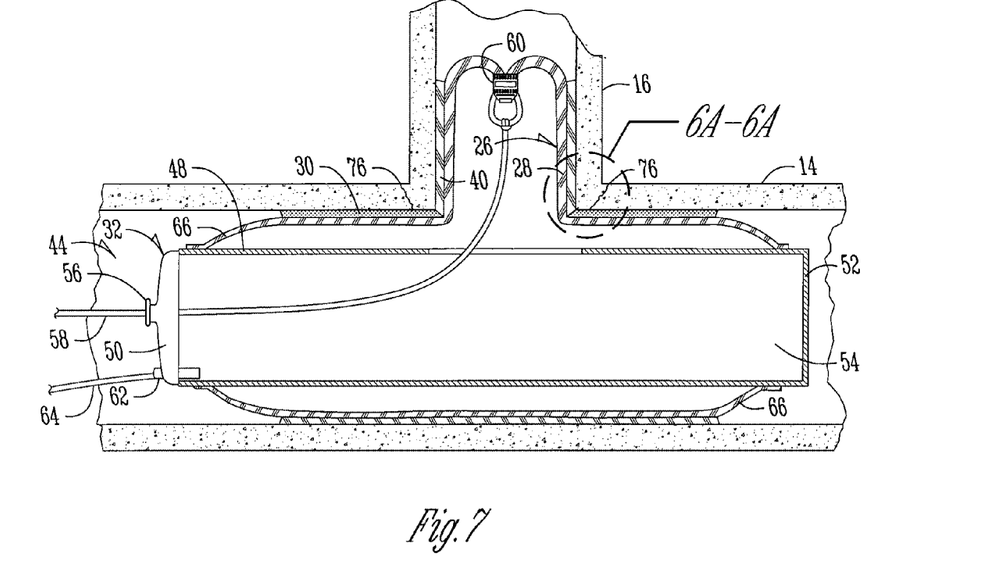
FIG. 7 is a sectional view similar to FIG. 6, showing the liner assembly in its inflated position.

FIGS. 6 and 7 show the repair assembly 44 within a main sewer pipe 14 which is connected to a lateral sewer pipe 16. A damaged portion of pipe 76 is shown needing repair. Ground water from outside the lateral sewer pipe 16 and the main sewer pipe 14 will seep through the damaged portion 76 and enter the interior of the main sewer pipe 14 and the lateral sewer pipe 16. The present invention is intended to prevent the seepage of ground water.

FIG. 6 shows the repair assembly 44 moved within the main sewer pipe 14 adjacent the lateral sewer pipe 16. The launcher device opening 74 is registered with a junction between the lateral sewer pipe 16 and the main sewer pipe 14. This alignment is done with a TV camera (not shown). The lateral bladder tube 68 and the lateral liner tube 28 are contained within the launcher device cavity 54. To accommodate a longer lateral lining tube 28, the launcher device cavity 54 can be extended by placing a lay-flat rubber hose between the open end of the launcher device 32 and the end cap 50.

Figure 7A:
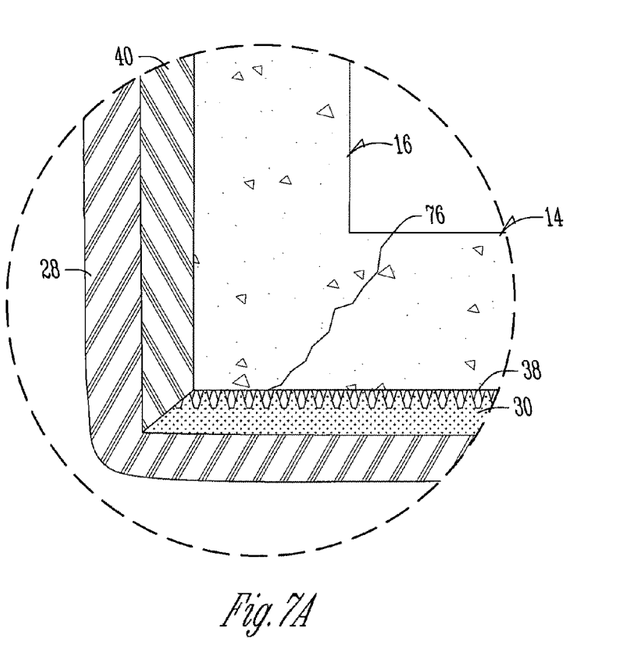
FIG. 7A is an enlarged sectional view of the junction between the main sewer pipe and the lateral sewer pipe in FIG. 7.

Air pressure is introduced into the cavity 54 through the air hose 64, urging the main/lateral liner assembly 26 into contact with the interior walls of the main sewer pipe 14 and the lateral sewer pipe 16. Continued air pressure causes the lateral bladder tube 68 and the lateral liner tube 28 to evert outwardly through the launcher device opening 74 into the lateral sewer pipe 16 from the position shown in FIG. 6 to the position shown in FIG. 7. Although air is the preferred pressurized material, other fluids may be used. It should be noted that the eversion process causes the lateral liner tube 28 to be placed on the outside of the lateral bladder tube 68 once the eversion is complete, as shown in FIG. 7. Pressure within the launcher device cavity 54 is maintained until the resin impregnated lateral liner tube cures and hardens. The lining around the damaged portion of pipe 76 is more clearly shown in FIG. 7A.

As for the main liner member 30, the mastic resin is applied to the exterior surface. Extra resin should be added. Since the non-resin absorbent material is virtually non-compressible having peaks and raised areas, the excess resin that is above the peak or raised area is allowed to migrate into open joints and fractures, yet when the peaks or raised areas contact the interior wall of the pipe, the wall thickness of the main liner member 30 is maintained as designed, thus achieving the desired physical properties of the cured-in-place pipe. Note that the excess resin is not wiped off of the main liner member 30 during the insertion process as the main liner member 30 is affixed to the launching device 32. The launching device 32 is elevated off of the pipe invert by means of wheels and/or skids (not shown) so that the launching device 32 and the main/lateral liner assembly is moved through the main sewer pipe 14 to the junction with the lateral sewer pipe 16 while the main liner member 30 resin is not contacting the interior wall of the main sewer pipe 14.

Figure 16:
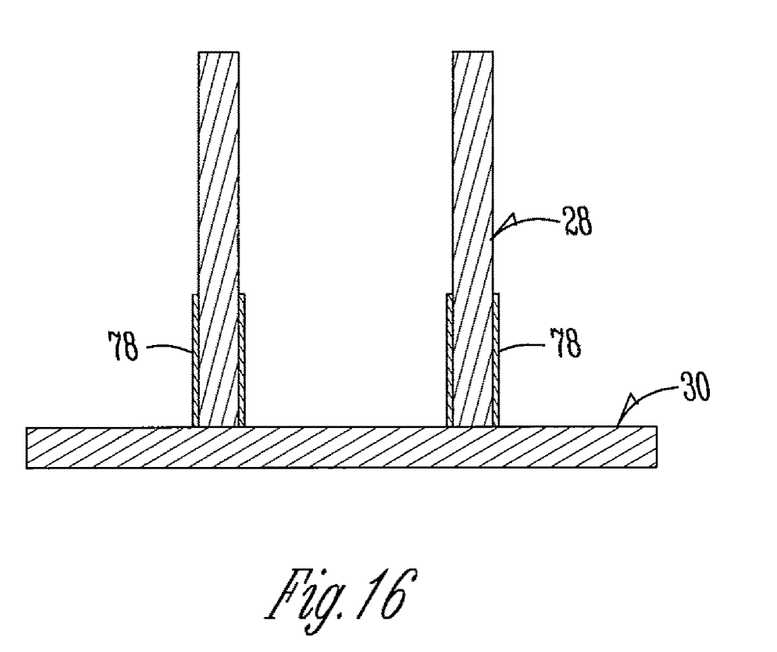
FIG. 16 is a sectional view of another alternative embodiment of the main/lateral liner assembly.

The thicker main liner member 30 also allows for a superior connection between the main liner member 30 and the lateral liner tube 28. Though the main liner member 30 and the lateral liner tube 28 need not be permanently connected during installation, it is preferred to permanently connect the linings in order to ensure that they are not separated during insertion through the main sewer pipe 14. It is also preferred to permanently connect the main liner member 30 and the lateral liner tube 28 to ensure a leak-free connection. Such a connection can be made by stitching and thermal welding or chemically bonding the main liner member 30 and the lateral liner tube 28. An alternative means of connecting the two liners is shown in FIG. 16. Here, the main liner member 30 includes a double wall circular member 78 that extends from the exterior surface of the main liner member 30 around the opening in the main liner member 30 to the lateral liner tube 28. The double wall circular member is filled with a liquid resin and the end of the lateral liner tube 28 is inserted into the space between the two walls of the double wall circular member 78 to make a connection and seal.

Figure 13:
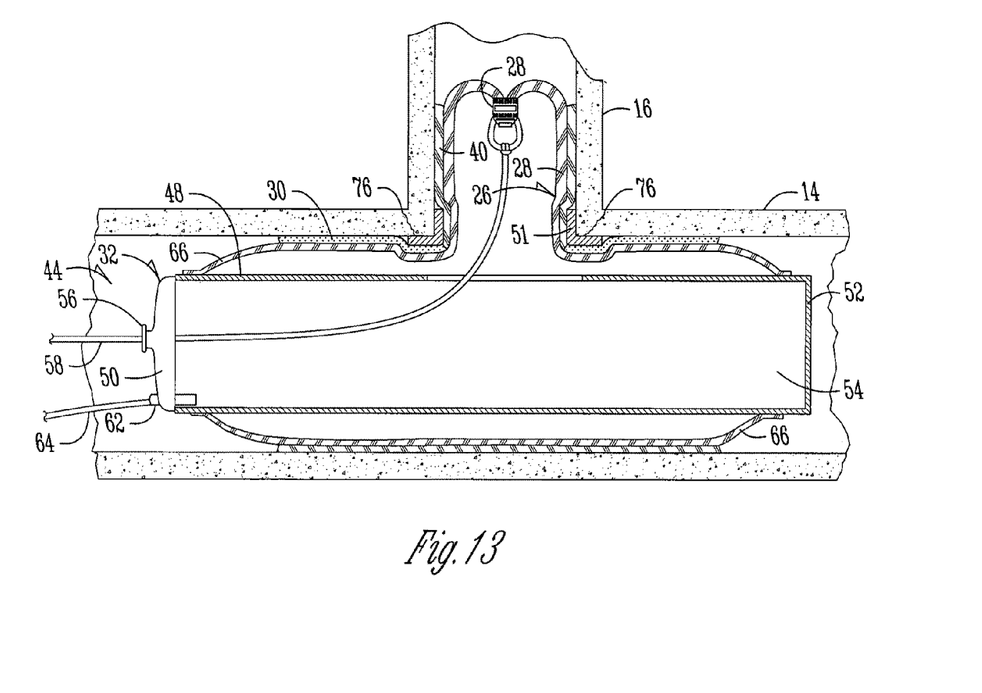
FIG. 13 is a sectional view similar to FIG. 7, showing another alternative embodiment of the main/lateral liner assembly.
Figure 14:
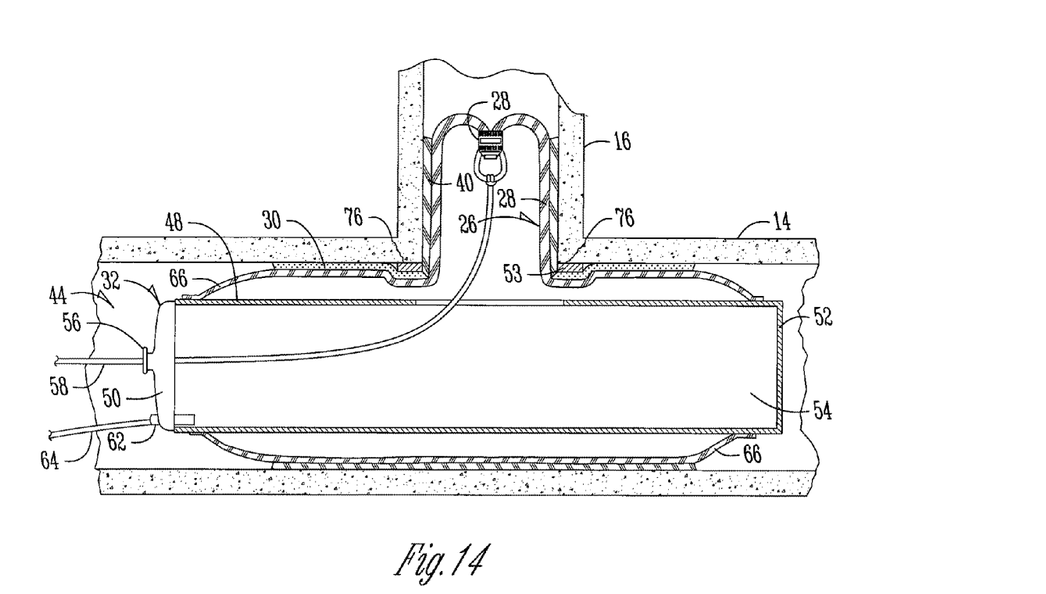
FIG. 14 is a sectional view similar to FIG. 3, showing another alternative embodiment of the main/lateral liner assembly.
Figure 15:
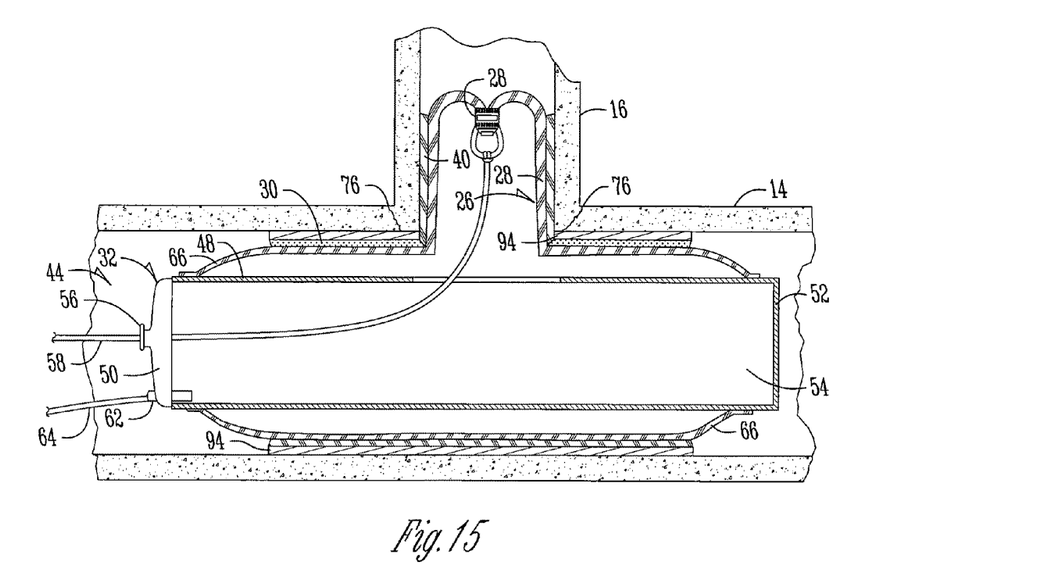
FIG. 15 is a sectional view similar to FIG. 14, showing another embodiment of the main/lateral assembly.

As discussed previously, it is preferred that one or more compressible members, such as hydrophilic bands or O-rings, be placed around the main liner member 30. FIGS. 13-15 illustrate additional embodiments wherein other hydrophilic sealing members are also used. As shown in FIG. 13, a gasket 51 is positioned about a portion of the main/lateral liner assembly 26. The gasket 51 includes a tubular portion that extends at least partially within the lateral liner tube 28 and a flange portion that extends outwardly about the periphery of one end of the tubular portion. The flange portion of the gasket 51 is preferably attached to the main liner member 30 around the juncture between the main liner member 30 and the lateral liner tube 28 so as to maintain the gasket 51 in proper position as the repair assembly 44 is positioned for operation. The gasket 51 is preferably made of a hydrophilic material capable of swelling in response to being exposed to water or other liquid. However, other materials for the gasket 51 found suitable include neoprene rubber, other similar gasket materials such as urethane or silicone rubber, and like impermeable compressible materials.

The ground water can seep towards the hydrophilic gasket 51. However, upon encountering the hydrophilic gasket, the water causes the gasket to expand in both a radial inward direction and a radial outward direction. This causes the gasket 51 to form a water tight seal between the main/lateral liner assembly 26 and the interior walls of the main pipe line 14 and the lateral pipe 16.

As shown in FIG. 14, the gasket 51 is replaced with a ring-shaped band or collar 53 of hydrophilic material or other compressible material. The band 53 is positioned on the main liner member 30 and extends around the juncture between the main liner member 30 and the lateral liner tube 28. The band 53 is again preferably made of a hydrophilic material and swells in response to being exposed to water or other liquid. In specific, the band 53 expands outwardly and inwardly in a radial direction to effectively seal the area between the liner assembly 26 and the juncture between the main pipe 14 and lateral pipe 16. In applications where the lateral liner tube 28 is everted into the lateral pipe 16, it is preferred that the band 53 be attached to the main liner member 30 to secure the band in place. The band can be attached by use of an adhesive or similar attachment means.

The ring-shaped band in 53 in FIG. 14 can be enlarged to form a sheet that surrounds the main liner member 30, forming a sealing liner. FIG. 15 illustrates such an arrangement. Here, a sealing liner 94 of compressible material (preferably hydrophilic) forms a tube that surrounds and approximates the size of the main liner member 30. It is preferred that the sealing liner 94 extend substantially the entire length of the main liner member 30. The main liner member shown in FIG. 15 is non-resin absorbent; however, a resin absorbent liner can also be used with the sealing liner 94. The sealing 94 creates a seal between the exterior surface of the main liner member 30 and the interior wall of the pipe 14. The main liner member 30 and sealing liner 94 can be moved through the pipe 14 together, as shown in FIG. 15. Those skilled in the art having the benefit of this disclosure will appreciate that the sealing member can also be used in lateral or main line pipe repairs, and not necessarily main/lateral junction repairs. In such cases, the sealing liner 94 can be inverted with a tubular liner as part of a liner/bladder assembly. Still further yet, the sealing liner 94 can be first moved into position adjacent the damaged area of pipe and a tubular liner saturated with resin later everted or otherwise inserted into the sealing member. The sealing member 94 is pressed against the interior of the host pipe between the host pipe and the tubular liner saturated with resin. In this arrangement there is no resin to adhere the main liner member 30 directly to the main pipe 14. However, the resin on the main liner member 30 cures to form a rigid structure, and where the main liner member 30 forms an interior lining of the main pipe 14.

Figure 8:
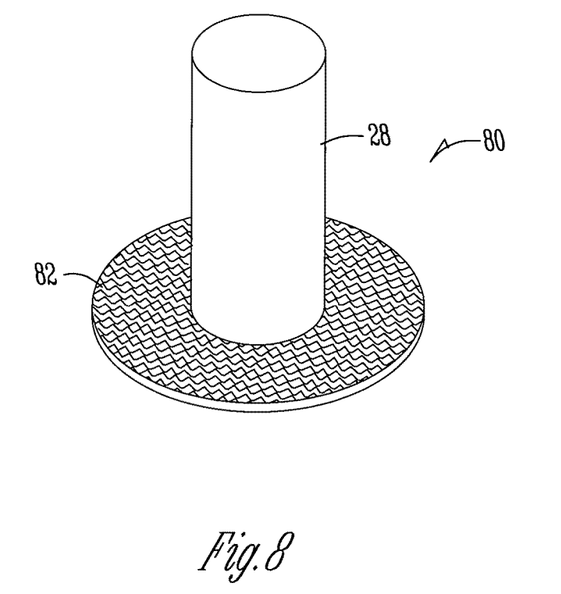
FIG. 8 is a perspective view of an alternative embodiment of the main/lateral liner assembly of the present invention.

FIGS. 8-12 show various other alternative embodiments for the main/lateral liner assembly. FIG. 8 shows a main/lateral liner assembly 80 that comprises a lateral liner tube 28 and a main liner member 82 shaped in the form of a collar. This configuration is typically referred to as a "top hat" liner in the industry. As distinguished from a typical "top hat", the main/lateral liner assembly 80 in FIG. 8 includes a collar 82 formed from the same non-resin absorbent material with an uneven exterior surface as previously disclosed. The collar 82 only helps to seal the area around the opening to the lateral sewer pipe 14, and does not line the full circumference of the main sewer pipe 16.

Figure 9:
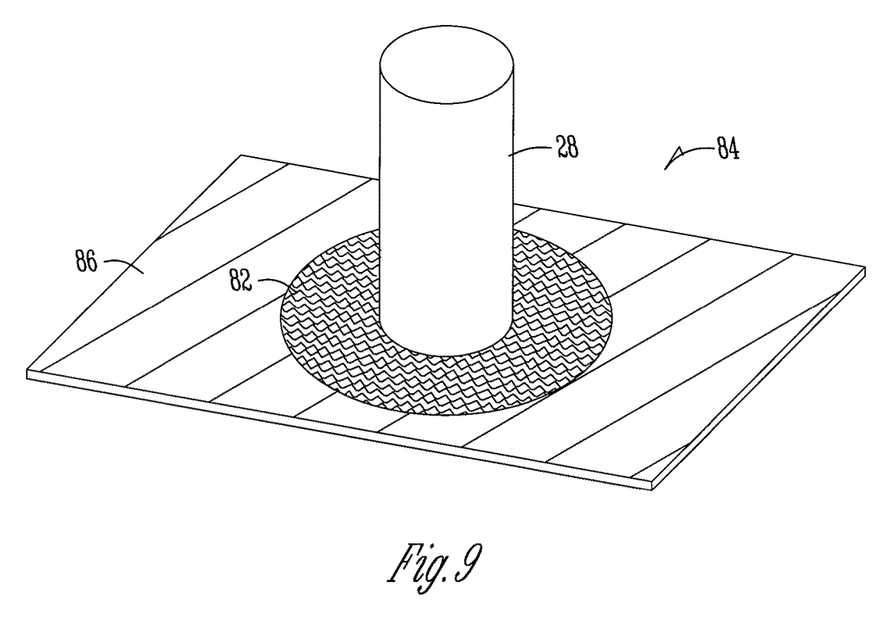
FIG. 9 is a perspective view of another alternative embodiment of the main/lateral liner assembly of the present invention.

Another alternative embodiment of the main/lateral liner assembly is shown in FIG. 9. Here, the main/lateral liner assembly 84 includes the same lateral liner tube 28 and collar 82 of non-resin absorbent material. A secondary main liner member 86 extends from the periphery of the collar 82. The secondary main liner member 86 is a resin absorbent felt material with plastic coating similar in construction to the lateral liner tube 28. Because the highest pressures are applied to the main/lateral liner assembly 84 near the juncture between the lateral lining tube 28 and the main liner portion, using only a collar of non-resin absorbent material with a felt liner extending therefrom allows for a full circumference wrap on the interior wall of the main sewer pipe 16 while minimizing the cost associated with a full sheet of non-resin absorbent material. In addition, a full circumference wrap provides structural support against hydraulic loading and helps ensure that the collar 82 will not fall away if disbanding occurs.

Figure 10:
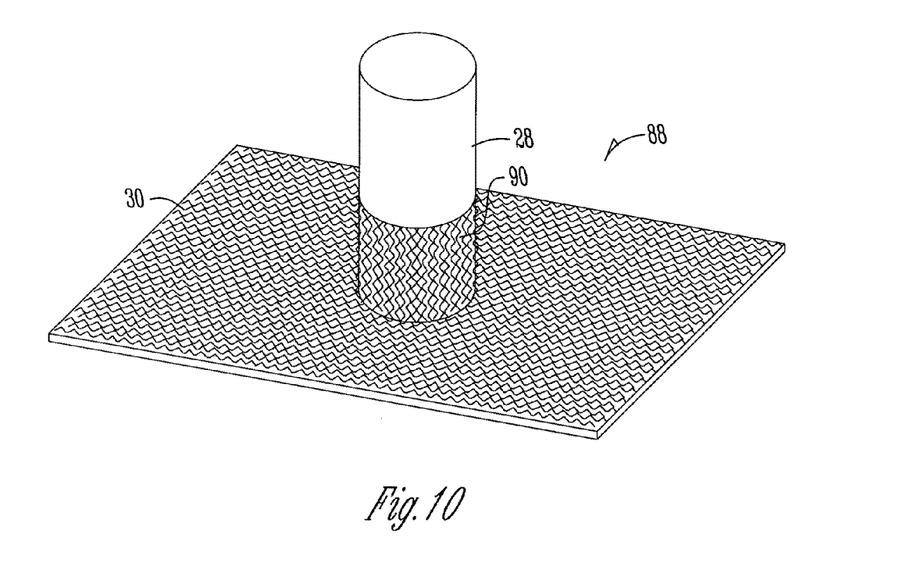
FIG. 10 is a perspective view of yet another alternative embodiment of the main/lateral liner assembly of the present invention.

Another alternative embodiment is shown in FIG. 10. Here, the main/lateral liner assembly 88 includes a lateral liner tube 28 and a main liner member 30 as previously disclosed. What is different is that a tubular section 90 of non-resin absorbent material with the same uneven exterior surface as on the main liner member 30 extends above the main liner member 30 around the main liner opening, which then transitions to the lateral liner tube 28. This embodiment helps avoid the situation where the end of the lateral liner tube 28 has a reduced thickness caused by excess fluid pressures applied during the eversion process. The embodiment shown in FIG. 10 can be further modified such that tubular section 90 extends further into the lateral pipe 14, avoiding the need for a separate lateral liner tube 28 that is resin absorbent. Both the main and lateral portions of main/lateral liner assembly 88 would be made from a non-resin impregnable material with uneven exterior surfaces or apertures adapted to receive resin.

Figure 11:
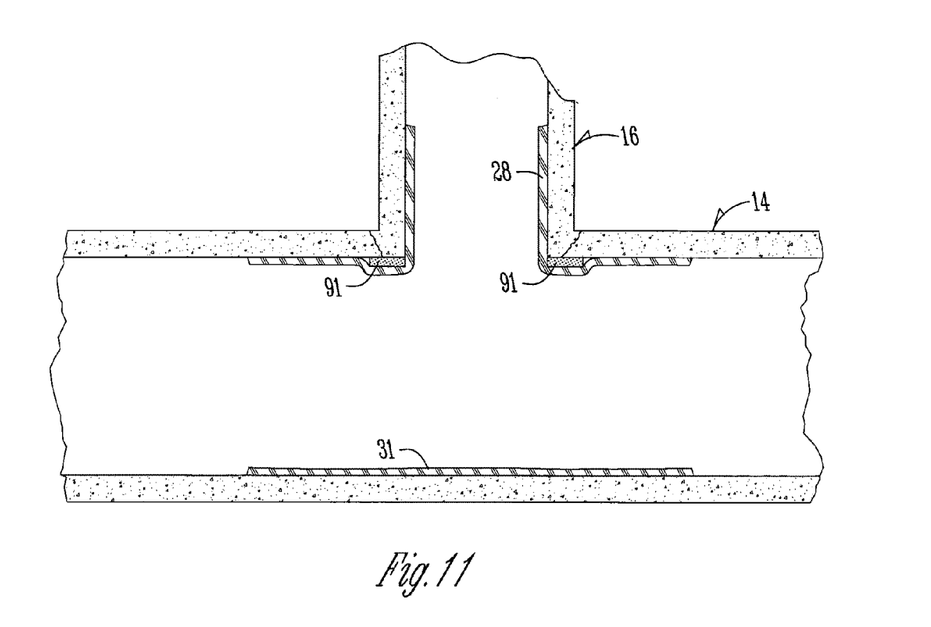
FIG. 11 is a sectional view of an alternative embodiment of the main/lateral liner assembly of the present invention, as installed in a pipeline.

FIG. 11 is a sectional view that illustrates another alternative embodiment of the main/liner assembly. The liner assembly is formed using a lateral liner tube 28 and main liner member 31 made of felt. A ring or donut 91 of non-resin absorbent material having an uneven exterior surface is positioned on top of the main liner member 31 around the lining junction between the main liner member 31 and the lateral lining tube 28. The lateral liner tube 28 is threaded through the ring 91. Although the ring 91 need not be permanently attached, it is desirable to permanently attach the ring to the main liner tube 31. The ring 91 may be held in place by resin or other means, such as snaps, stitching, stapling, welding and similar means.

Figure 12:
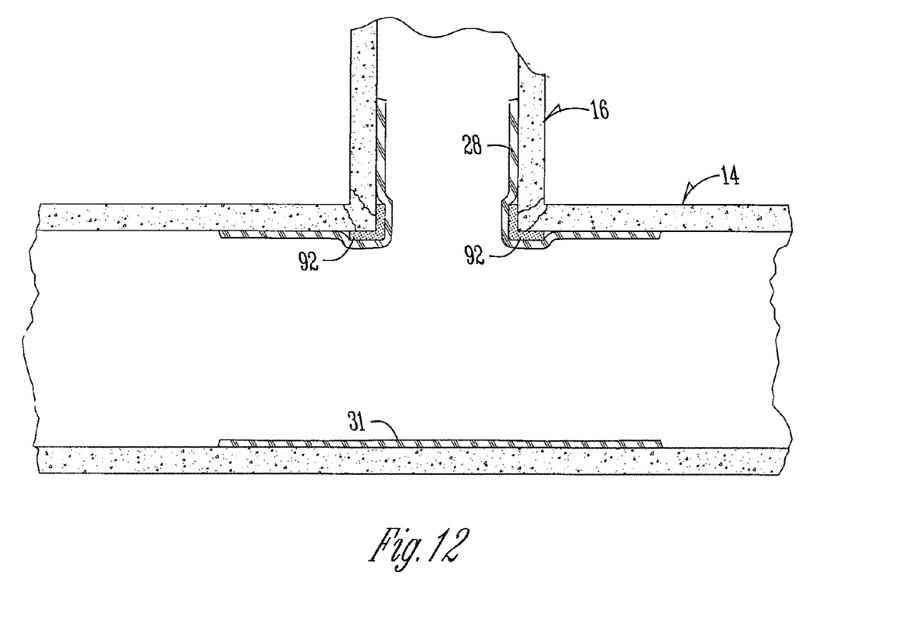
FIG. 12 is a sectional view of another alternative embodiment of the main/lateral liner assembly of the present invention, as installed in a pipeline.

FIG. 12 illustrates yet another alternative embodiment of the main/lateral lining assembly. Instead of a donut 91 positioned on top of the main liner member 31, a "top hat" or gasket 92 of thermoplastic material having protrusions and depressions on the exterior surface is positioned over a portion of both the main liner member 31 and the lateral liner tube 28. This embodiment has the advantage of providing extra protection along the lateral liner tube 28 at the juncture between the lateral sewer pipe 14 and the main sewer pipe 16.

This detailed description is of exemplary embodiments and various modifications and variations are contemplated. For example, the main/lateral liner assemblies described above may be installed in the host pipes by using a one-piece main and lateral bladder or two separate bladders may be used. The lateral lining may be open ended with a bladder extending beyond the lateral lining at the upper most end of the lateral lining or the lateral lining may be closed, requiring cutting. The lateral lining may also be installed using a bladderless type application, such as disclosed in pending application Ser. No. 12/026,209, the contents of which are incorporated herein by reference.

What is claimed is:

1. A liner assembly for repairing a damaged junction between a main pipe and a lateral pipe comprising:
   a main liner member having a main liner member opening and formed from a non-resin absorbent material having an uneven exterior surface comprising a plurality of projections, protrusions, or voids to receive a curable resin that contacts an interior wall of the main pipe; and
   a resin absorbent lateral liner tube extending from the main liner member about the main liner member opening and adapted to extend within the lateral pipe and contact an interior wall of the lateral pipe.

2. The liner assembly of claim 1 wherein the main liner member forms a collar.

3. The liner assembly of claim 2 further comprising a secondary main liner member of resin absorbable flexible material extending from a periphery of the collar and adapted to form a tubular structure with the collar and conform to the interior wall of the main pipe.

4. The liner assembly of claim 1 wherein the main liner member forms a tube.

5. The liner assembly of claim 1 wherein the lateral liner tube is flarible and adapted to conform to the interior wall of the lateral pipe.

6. The liner assembly of claim 1 wherein the non-resin absorbent material is a thermoplastic or thermoset material.

7. The liner assembly of claim 1 further comprising a compressible member surrounding at least a portion of the main liner member and being adapted to form a seal between the exterior surface of the main liner member and the interior wall of the main pipe.

8. The liner assembly of claim 7 wherein the compressible member is a hydrophilic member being capable of swelling in response to being exposed to a liquid, thereby forming a seal between the exterior surface of the main liner member and the interior wall of the main pipe.

9. A liner assembly for repairing a damaged junction between a main pipe and a lateral pipe comprising:
   a main liner member having a main liner member opening and formed from a non-resin absorbent material having an exterior surface adapted to receive a curable resin that contacts an interior wall of the main pipe, wherein the main liner member forms a tube; and
   resin absorbent lateral liner tube extending from the main liner member about the main liner member opening and adapted to extend within the lateral pipe and contact an interior wall of the lateral pipe.

10. The liner assembly of claim 9 wherein the exterior surface includes a plurality of protrusions with spaced areas there between.

11. A liner assembly for repairing a damaged junction between a main pipe and a lateral pipe comprising:
   a main liner member having a main liner member opening and formed from a non-resin absorbent material having an exterior surface adapted to receive a curable resin that contacts an interior wall of the main pipe; and
   a resin absorbent lateral liner tube extending from the main liner member about the main liner member opening and adapted to extend within the lateral pipe and contact an interior wall of the lateral pipe;
   wherein the exterior surface of the main liner member being adapted to mechanically bond the resin to the main liner member after the resin cures and hardens about the exterior surface of the main liner member.

12. The liner assembly of claim 11 wherein the exterior surface of the main liner member includes projections adapted to mechanically bond the resin to the lining tube after the resin cures and hardens about the exterior surface of the main liner member.

13. The liner assembly of claim 11 wherein the exterior surface of the main liner member includes hooklike projections adapted to mechanically bond the resin to the lining tube after the resin cures and hardens about the exterior surface of the main liner member.

14. The liner assembly of claim 11 wherein the lateral liner tube is flarible and adapted to conform to the interior wall of the lateral pipe.

15. The liner assembly of claim 11 wherein the main liner member forms a collar and further comprising a secondary main liner member of resin absorbable flexible material extending from a periphery of the collar and adapted to form a tubular structure with the collar and conform to the interior wall of the main pipe.

16. The liner assembly of claim 11 wherein the non-resin absorbent material is a thermoplastic or thermoset material.

17. The liner assembly of claim 9 further comprising a compressible member surrounding at least a portion of the main liner member and being adapted to form a seal between the exterior surface of the main liner member and the interior wall of the main pipe.

18. The liner assembly of claim 17 wherein the compressible member is a hydrophilic member being capable of swelling in response to being exposed to a liquid, thereby forming a seal between the exterior surface of the main liner member and the interior wall of the main pipe.

19. A liner assembly for repairing a damaged junction between a main pipe and a lateral pipe comprising:
   a main liner member having a main liner member opening and formed from a non-resin absorbent material having a smooth interior surface and an exterior surface with a plurality of protrusions adapted to receive a curable resin that contacts an interior wall of the main pipe;
   a lateral liner tube extending from the main liner member opening and having an exterior surface adapted to receive a curable resin that contacts an interior wall of the lateral pipe; and
   a compressible sealing member positioned at least partially on the main liner member.

20. The liner assembly of claim 19 Wherein the compressible sealing member is a sheet of material surrounding a portion of the main liner member on opposite sides of the main liner member opening.

21. The liner assembly of claim 19 wherein the compressible sealing member is a collar disposed on the main liner member around the main liner member opening.

22. The liner assembly of claim 21 wherein the collar further comprises a tubular portion surrounding a portion of the lateral liner and being adapted to contact an interior wall of the lateral pipe.

23. The liner assembly of claim 19 wherein the lateral liner tube is formed from a resin-absorbent material.

24. The liner assembly of claim 19 wherein the compressible sealing member is hydrophilic.

25. A liner assembly for use with a resin in repairing a damaged junction between a main pipe and a lateral pipe comprising:
   a main liner member having a main liner member opening and formed from a non-resin absorbent material having an exterior surface with a plurality of projections and being adapted to extend within the main pipe and contact an interior wall of the main pipe;

a lateral liner extending from the main liner member about the main liner member opening and being formed of a resin absorbent material and adapted to extend within the lateral pipe and contact an interior wall of the lateral pipe;

wherein the plurality of projections are adapted to mechanically bond the resin to the main liner member after the resin cures and hardens about the exterior surface of the main liner member.

26. The liner assembly of claim 25 wherein the main liner member forms a tube.

27. The liner assembly of claim 25 wherein the main liner member forms a collar.

28. The liner assembly of claim 25 wherein the plurality of projections are hook-like projections.

29. A liner assembly for use with a resin in repairing a damaged junction between a main pipe and a lateral pipe comprising:

a main liner member having a main liner member opening and formed from a non-resin absorbent material having an uneven exterior surface comprising a plurality of projections, protrusions, or voids to receive the resin and contact an interior wall of the main pipe;

a tubular member of non-resin absorbent material extending from the main liner member opening; and a resin absorbent lateral liner tube extending from the tubular member of non-resin absorbent material and being adapted to extend within the lateral pipe and contact an interior wall of the lateral, pipe.

30. The liner assembly of claim 29 wherein the main liner member forms a tube.

31. The liner assembly of claim 29 wherein the tubular member of non-resin absorbent material has an uneven exterior surface comprising a plurality of projections, protrusions, or voids to receive the resin.

32. The liner assembly of claim 29 wherein the tubular member of non-resin absorbent material is adapted to extend into the lateral pipe and contact the interior surface of the lateral pipe.

* * * * *

UNITED STATES PATENT AND TRADEMARK OFFICE
CERTIFICATE OF CORRECTION

Page 1 of 1

PATENT NO.         : 7,987,873 B2
APPLICATION NO.    : 12/026909
DATED              : August 2, 2011
INVENTOR(S)        : Larry W. Kiest, Jr.

It is certified that error appears in the above-identified patent and that said Letters Patent is hereby corrected as shown below:

Column 12, Claim 20, Line 47

DELETE: after claim 19 "Wherein"

ADD: after claim 19 -- wherein --

Signed and Sealed this
Thirteenth Day of September, 2011

David J. Kappos
*Director of the United States Patent and Trademark Office*